(12) United States Patent
Adelman

(10) Patent No.: US 11,365,720 B1
(45) Date of Patent: Jun. 21, 2022

(54) DEVICE TO ENHANCE RADIANT TRANSFER OF HEAT FROM THE EARTH TO OUTER SPACE

(71) Applicant: Michael Ross Adelman, Bethesda, MD (US)

(72) Inventor: Michael Ross Adelman, Bethesda, MD (US)

( * ) Notice: Subject to any disclaimer, the term of this patent is extended or adjusted under 35 U.S.C. 154(b) by 0 days.

(21) Appl. No.: 17/457,517

(22) Filed: Dec. 3, 2021

Related U.S. Application Data

(60) Provisional application No. 63/277,654, filed on Nov. 10, 2021.

(51) Int. Cl.
| | |
|---|---|
| *F03D 9/00* | (2016.01) |
| *H02S 10/12* | (2014.01) |
| *F03D 9/25* | (2016.01) |
| *F03D 9/11* | (2016.01) |
| *F03D 9/18* | (2016.01) |

(52) U.S. Cl.
CPC .............. *F03D 9/007* (2013.01); *H02S 10/12* (2014.12); *F03D 9/11* (2016.05); *F03D 9/18* (2016.05); *F03D 9/25* (2016.05)

(58) Field of Classification Search
CPC ... F03D 9/007; F03D 9/11; F03D 9/18; F03D 9/25; H02S 10/12
See application file for complete search history.

(56) References Cited

U.S. PATENT DOCUMENTS

| | | | |
|---|---|---|---|
| 2009/0205266 A1* | 8/2009 | Fennell | E04B 1/24 52/79.1 |
| 2016/0363396 A1* | 12/2016 | Liu | F28B 1/06 |

* cited by examiner

*Primary Examiner* — Viet P Nguyen

(57) ABSTRACT

A Device to Enhance Radiant Transfer of Heat from the Earth to Outer Space comprising a collector of energy from a renewable energy source, a storage device for the collected electrical energy in a rechargeable battery, a radiant energy emitter plate consisting of an enclosure with supports, radiant energy emitter plate, plate heating elements, insulating elements for reduction of heat loss via conduction from the enclosure and insulating elements for reduction of heat loss via convection from the enclosure, temperature sensor, and a controller device for regulating the connection and flow of gathered energy from the collector to the storage device to the radiant energy emitter plate.

3 Claims, 1 Drawing Sheet

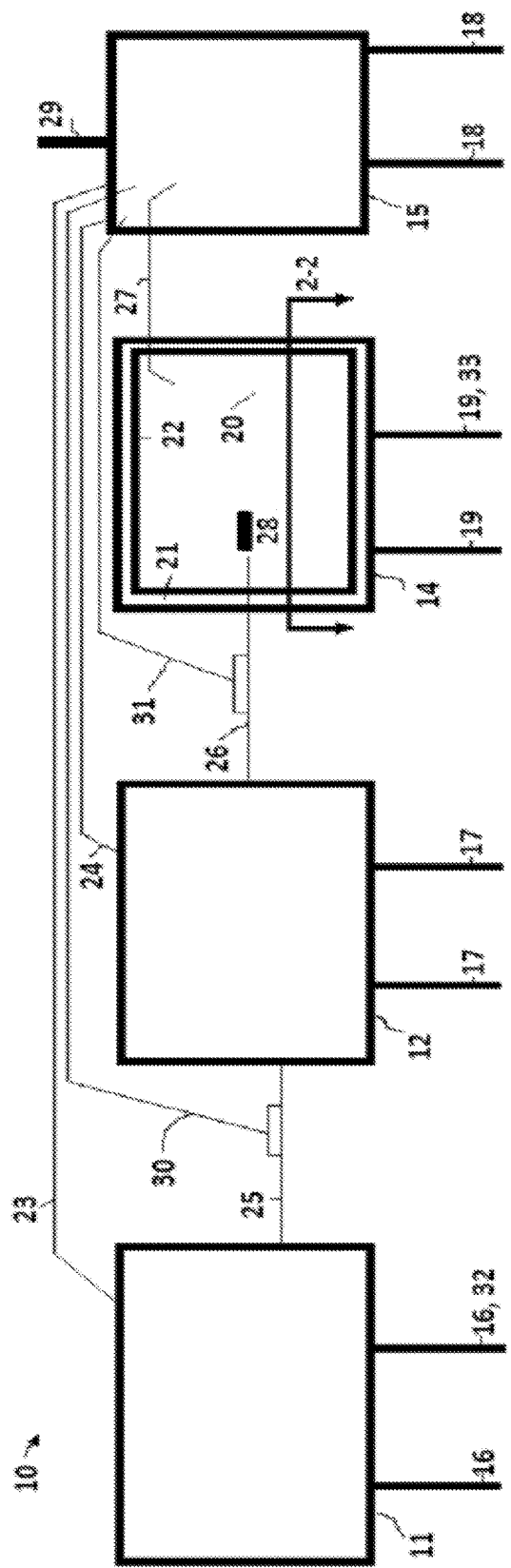
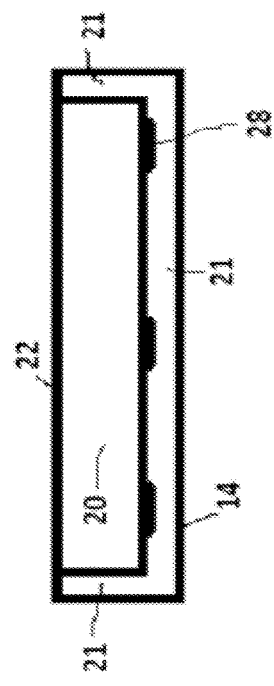

DEVICE TO ENHANCE RADIANT TRANSFER OF HEAT FROM THE EARTH TO OUTER SPACE

In an effort to reduce the CO2 present in the atmosphere so as to facilitate the resumption of outbound radiant transfer of heat energy, all sorts of schemes have been proposed. These include reducing the emission of CO2 during the power generation process associated with the Carbon contained within fossil fuels. It is the chemical reaction of the Carbon with Oxygen during the combustion process that releases the CO2. It is reported that the replacement of coal with natural gas as a fossil fuel reduces the CO2 emitted. CO2 is not released from nuclear power generation plants. CO2 is not released from Geo-thermal power generation plants.

Other ideas for the reduction of CO2 have also been advanced such as CO2 sequestration. Ideas, such as placing an earth heat shield in space may prevent heat from entering the earth's atmosphere but would likely adversely prevent heat from transferring back out, something that should be approached very, very carefully.

Another proposal put forward to reduce the CO2 released during power generation is to generate power by utilizing nuclear energy. True, while there is no release of CO2 during the production of nuclear power when the energy is extracted from the uranium fuel, there is plenty of heat released directly into the environment.

But the bulk of the heat, which is ultimately heating the earth, is coming from the release of heat during the combustion process of fossil fuels and the release of energy during the reactions of the nuclear fuels. The heat energy of these fuels, until it is released, has remained stored (over the ages) within and has not yet been released until the recent increases in power generation utilizing these fuels.

For Geo-thermal power generation, while there is no release of CO2 caused by combustion, plenty of heat is brought up to the surface from far below.

For solar and wind power generation and other renewables, such as hydroelectric, the energy derives from the sun, whose energy and heat released, which if not collected, would end up in the earth's environment anyway. Even when the solar or wind energy is extracted for power generation, no CO2 is released.

During power generation and other direct combustion of fossil fuels and production of nuclear power, there is an enormous amount of heat released directly into the environment. At the current time, over 25 terra-watt-hours of electrical power are produced in the world, approximately 65% from fossil fuels and 10% from nuclear. Even if we optimistically estimate that these plants are 50% efficient, half of the released energy as waste heat goes directly to heating the environment via cooling towers and waterways. This is not going away with either nuclear fission power generation or nuclear fusion power generation, if that ever becomes commercially viable. Ultimately, all of the energy released from the burning of fossil fuels or the energy released during the generation of nuclear power all gets dissipated into the environment. And, of course, an enormous amount of heat is released from the fossil fuels burned directly for other purposes, such as direct heating, manufacturing, cars, airplanes and other forms of transportation.

The release of heat during the burning of fossil fuels and the release of heat during the nuclear reactions during power generation are the actual source of the global heating. Simply reducing the by-products of combustion will help to reduce CO2 release, but will not stop the immense quantity of heat energy released. Reducing the amount of CO2 in the atmosphere could improve the amount of radiant heat transferred out, if any of the other schemes to control it materialize.

Therefore, it is the balance between both the incoming radiant energy from the sun as well as release of heat from burning of fossil fuels and nuclear reactions in conjunction with the outgoing radiant transfer of the heat to outer space that affects the rise in the earth's temperature. If the incoming and released heat energy exceeds the outgoing heat energy the earth will heat up. Once equilibrium is reached between incoming and outgoing energy, the earth's temperature will stabilize. But, as has been reported for recent years, the resultant atmospheric temperature is rising slowly. Providing a means to reduce this rise in temperature is the purpose of this invention.

In engineering terms, the transfer of heat by radiant means is the most difficult to understand. Think of radiant heaters in outdoor restaurants which pass heat from the heating elements directly to your person, without heating the air in between. Think also of the phenomenon of earth's deserts cooling down in the nighttime, the heat being transferred radiantly from earth's surface to the emptiness of outer space. It is the outgoing radiant transfer of heat energy that is at issue in the discussion herein of a Device to Enhance Radiant Transfer of Heat from the Earth to Outer Space.

In the context of this invention, the temperature of the Radiant Energy Emitter Plate and sink of outer space are important factors in the amount of heat transferred. The higher the temperature of the Radiant Energy Emitter Plate, relative to the presumed temperature of outer space (near absolute zero), affect the amount of heat transferred out to outer space.

Heretofore, several devices have been developed to provide for radiant heat transfer from devices. These devices are described in U.S. Pat. Nos. 4,019,466; 5,238,210; 3,564,253; and 5,820,361.

Associated with each of the previously developed devices have been certain disadvantages or limitations. These are most generally characterized as only pertaining to the concurrent operation with another device which produces and releases waste heat such as air conditioning equipment. There is no provision within these devices to increase the heat transferred by the methods described in the present invention.

Therefore, chief object of the present invention is to provide a Device to Enhance Radiant Transfer of Heat from the Earth to Outer Space over and above that radiant heat transfer that occurs at the present time naturally and primarily at night. This is achieved in the preferred embodiment by providing the means to increase the heat transmitted to outer space by the Radiant Energy Emitter Plate.

Another object of the invention is to provide the means to increase the heat transmitted to outer space by the Radiant Energy Emitter Plate utilizing renewable energy.

Another object of the invention is to provide the means to maintain and/or increase the surface temperature of the Radiant Energy Emitter Plate thereby increasing the heat transferred to Outer Space.

Another object of the invention is to provide the means to increase the duration the surface temperature at which the Radiant Energy Emitter Plate is maintained, thereby increasing the heat transferred to Outer Space.

SUMMARY OF THE INVENTION

The preferred embodiment of the present invention provides a Device to Enhance Radiant Transfer of Heat from the Earth to Outer Space over and above that which naturally occurs.

The said device consists of:

A collector of electrical energy: Solar panel (s) consisting of Solar Cells, Wind Turbine, Hydro-electric generator or other renewable energy source. (A renewable source of energy in this context is defined as the generation of electrical power from a process that does not release stored heat contained in the fuel itself. Fuels which contain stored heat include fossil fuels as well as nuclear based fuels whose source is obtained from those fuels found in the earth itself.)

A device for storing the collected electrical energy: Rechargeable Battery or other storage device. Note that in the preferred embodiment, the collector of electrical energy (Solar panel) is depicted as a separate device from the Storage Device. In the case of the preferred embodiment, since the Solar Panel is operative during the daylight hours but the power is needed during the nighttime hours, a device for storing the collected electrical energy is required. In other embodiments, those two devices could be combined. Further, in other embodiments, such as wind or hydroelectric power, where that power could be available during the nighttime hours, a storage device could be omitted, although collection and storage of the power at all times would be desirable.

A Radiant Energy Emitter Plate: Consisting of the Emitter Plate, heating elements, and insulating elements for reduction of heat loss through conduction and convection. Note that in the preferred embodiment, the collector of electrical energy (Solar panel) is depicted as a separate device from the Radiant Energy Emitter Plate. In other embodiments, those two devices could be combined. Further, in the preferred embodiment, insulation for conduction and convection are depicted to prevent losses of heat to the ambient environment. In other embodiments, the insulation may be of a different configuration.

A Controller device: regulating the connection and flow of electrical energy from the Collector Device (Solar Panel) to the Storage Device (Battery), and then on to the Radiant Energy Emitter Plate. Note that in the preferred embodiment, the Controller device is depicted as a separate device from the other devices. In other embodiments, those devices could be combined.

In operation, electrical energy is collected in the Solar Panel. The electrical energy is transferred for storage to the Rechargeable Battery utilizing the Controller Device. In the preferred embodiment, the collection takes place in daylight hours during which time that the sun remains unobstructed as necessary to collect power.

The controller device controls the transfer, i.e., charging of the Rechargeable Battery pack to maximum capacity.

During daylight hours, the Radiant Energy Emitter Plate, also exposed to the sun is also heated up. Since it is insulated for conduction and convection, it can reach temperature over and above the surroundings.

Then, primarily at night time and when the sky is generally unobstructed by such things as clouds, etc., the electrical power stored in the battery is utilized to control and maintain the specified temperature range of the Radiant Energy Emitter Plate. This is achieved using the heating elements. The Controller device is utilized for this purpose using the temperature sensing device affixed to the Emitter plate. The specified temperature is maintained for as long as power from the battery is available. If the Emitter Plate's temperature exceeds the specified temperature, the controller will reduce the temperature of the plate by disconnecting the power to the heating elements. If the Emitter Plate's temperature falls below the specified temperature, the controller will increase the temperature of the plate by connecting the power to the heating elements.

This is the familiar mode of operation of a heating thermostat. As noted above, the specified temperature is maintained for as long as power from the battery is available. When the available power from the battery is consumed for this heating, the power is disconnected until more power becomes available, normally the next day.

Enhanced Radiant Transfer of Heat from the Earth to Outer Space is achieved the higher the temperature of Radiant Energy Emitter Plate is maintained, as well as maintaining that temperature for a longer duration.

Although the configuration shown in the preferred embodiment shows one Solar Panel, one Battery, one Controller and one Emitter Plate, any configuration may be implemented based on the components which have been installed on the land area on which the components are placed. Although not depicted in the preferred embodiment, more elaborate control mechanisms, such as alarms, condition sensors may be included in the configuration, including wired or wireless central control, thereby supporting flexible installations. Externally produced power is not required meaning that installations in even the most remote locations are supported, thereby providing the means of reducing the heat of the earth.

Other objects, advantages and features of the present invention will become apparent from the following detailed description of the preferred embodiment thereof, presented in conjunction with the accompanying drawings.

BRIEF DESCRIPTION OF THE DRAWINGS

FIG. 1 is a view of the preferred embodiment of A Device to Enhance Radiant Transfer of Heat from the Earth to Outer Space FIG. 2 is a view in elevation and in section of the Emitter Device of FIG. 1 taken along line 2-2.

DESCRIPTION OF A PREFERRED EMBODIMENT

Of course, the preferred and many other embodiments may be fabricated by a person skilled in the art.

With reference to the drawings, a preferred embodiment of A Device to Enhance Radiant Transfer of Heat from the Earth to Outer Space is shown in FIG. 1. As illustrated, it generally comprises:

10—The overall view of the invention being described
11—Solar Energy Collector Panel
12—Rechargeable Battery
14—Emitter Enclosure
15—Controller
16—Support Leg
17—Support Leg
18—Support Leg
19—Support Leg
20—Emitter Radiant Heating Element
21—Conductive Insulation
22—Convective Insulation
23—Solar Panel Sensor and Control Wire
24—Rechargeable Battery Sensor and Control Wire
25—Solar panel to Battery Charging Wire
26—Rechargeable Battery to Emitter Heating Coil Wire
27—Emitter Temperature Sensor
28—Heating Coils
29—Day/Night/Obstruction Sensor
30—Solar Cell to Battery Charging Wire and Switch 31—Battery to Heating Coil Wire and Switch
32—Position Adjusting Mechanism
33—Position Adjusting Mechanism Turning now to FIG. 2, the details of the Emitter will become understood as the description progresses.
20—Emitter Radiant Heating Element
21—Conductive Insulation
22—Convective Insulation
14—Emitter Enclosure
28—Heating Coils A Device to Enhance Radiant Transfer of Heat from the Earth to Outer Space 10 is depicted in FIG. 1.

In operation, electrical energy from the sun is collected in the Solar Panel 11 supported by legs 16. The Controller 15 monitors the status of the Solar Panel 11 via Sensor 23 and the status of the Battery 12 via Sensor 24. If the status of the Solar Panel 11 indicates that it is able to provide charging and the Battery 12 can receive charge, then the switch 30 is turned on. Once the Battery is fully charged, the switch 30 is turned off. The charging electrical energy is transferred for storage to the Battery 12 via wire 25. The collection normally takes place in daylight hours during which time that the sun remains unobstructed as necessary to collect power. In an alternate embodiment, the power obtained and stored may also be supplied from other sources at other locations. In alternate embodiments, if the electrical power is available at night and storage is deemed not to be required, then the battery is not required.

During daylight hours, the Radiant Energy Emitter Plate 20 is normally exposed to the sun in the preferred embodiment and reaches its nominal temperature. The Radiant Energy Emitter Plate 20 is insulated from its surroundings with conduction Insulation 21 and convection Insulation 22. In the preferred embodiment, the conduction Insulation 21 is fiberglass wool and the convection Insulation 22 is transparent plastic sheet.

Then, primarily at night time and when the sky is generally unobstructed by such things as clouds, etc., as sensed by the Day/Night/Obstruction Sensor 29, the electrical power stored in the Battery 12 is utilized to maintain the specified temperature range of the Radiant Energy Emitter Plate 20 using the heating elements 28 controlled by the switch 31 over wire 26. The Controller device is utilized for this purpose using the temperature sensing device 27 affixed to the Emitter plate 20. The specified temperature is maintained for as long as power from the battery 12 is available. If the temperature of the Emitter Plate 20 exceeds the specified temperature, the controller 15 will reduce the temperature of the plate 20 by disconnecting the power to it by utilizing switch 31. If the temperature of the Emitter Plate 20 falls below the specified temperature, the controller will increase the temperature of the plate by connecting the power to it utilizing switch 31. This is the familiar functioning of a temperature range of a heating thermostat.

In the preferred embodiment, as noted above, the specified temperature is maintained for as long as power from the Battery 12 is available. In an alternate embodiment, where electrical power is available during the nighttime, electrical power may be supplied directly from the power source. When the available power from the battery 12 is consumed for this heating, the power to the heating elements 28 is disconnected until more power becomes available, normally the next day.

Maintaining the specified temperature of the Emitter Plate over and above what it would normally cool without heating by the heating elements would increase the amount of heat transferred to Outer Space. Radiant heat transfer is measured by the difference in temperature of the Emitter Plate and the presumed temperature of Outer Space. The higher the difference in temperature and the longer the duration of the difference, the more heat will be transferred.

The features described above in the preferred embodiment are readily made in the correct size and configuration, all of which a person skilled in the art will have no trouble accomplishing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

Having thus set forth and disclosed the nature of this invention, what is claimed is:

1. A Device to Enhance Radiant Transfer of Heat from the Earth to Outer Space, the device comprising:
   a Collector Device for collecting electrical energy from a renewable energy source, the Collector Device being at least one of a Solar Cell, a Wind Turbine, and a Hydro-electric generator;
   a Storage Device for storing the collected electrical energy from the Collector Device, the Storage device being a rechargeable battery;
   a Radiant Energy Emitter Plate consisting of an emitter enclosure with support legs, an emitter radiant heating element, heating coils, insulating elements for reduction of heat loss via conduction from the emitter enclosure and insulating elements for reduction of heat loss via convection from the emitter enclosure, and a temperature sensor; and
   a Controller Device for regulating a connection and flow of the collected electrical energy from the Collector Device to the Storage Device to the Radiant Energy Emitter Plate via the heating coils to maintain a desired temperature for the Radiant Energy Emitter Plate's operation during nighttime hours of operation.

2. The device as set forth in claim 1, wherein the Controller Device further regulates the connection and flow of the collected electrical energy from the Collector Device to the Storage Device during times outside of the nighttime hours of operation.

3. The device as set forth in claim 1, further including position adjusting mechanisms for positioning the Collector Device and the Radiant Energy Emitter Plate.

* * * * *